United States Patent [19]

Nishiumi et al.

[11] 4,065,599

[45] Dec. 27, 1977

[54] SPHERICAL OBJECT USEFUL AS FILLER MATERIAL

[75] Inventors: Shiro Nishiumi; Shoichi Hasegawa, both of Otsu; Toshiyuki Mizoguchi, Osaka; Sachiko Furuta, Otsu, all of Japan

[73] Assignee: Toray Industries, Inc., Tokyo, Japan

[21] Appl. No.: 633,077

[22] Filed: Nov. 18, 1975

Related U.S. Application Data

[63] Continuation-in-part of Ser. No. 324,142, Jan. 16, 1973, abandoned.

[30] Foreign Application Priority Data

Jan. 19, 1972 Japan .................................. 47-6884

Jan. 25, 1972 Japan .................................. 47-8719

[51] Int. Cl.[2] .............................................. B32B 27/02

[52] U.S. Cl. .................................... 428/402; 428/357; 428/306; 5/361 R; 5/361 B

[58] Field of Search ............... 428/402, 357, 306, 323, 428/362, 369, 370, 371, 373, 374, 375, 377, 378, 392, 394, 395, 401, 402, 403, 407; 5/361 R, 361 B; 156/74; 264/89, 93, 121

[56] References Cited

U.S. PATENT DOCUMENTS

| | | | |
|---|---|---|---|
| 2,385,870 | 10/1945 | Lashar et al. | 154/33 |
| 2,571,334 | 10/1951 | Browne | 264/93 |
| 3,595,731 | 7/1971 | Davies et al. | 428/151 |
| 3,796,619 | 3/1974 | Rich | 156/180 |

*Primary Examiner*—Ralph S. Kendall

*Attorney, Agent, or Firm*—Miller & Prestia

[57] ABSTRACT

Down-like synthetic filler material comprises a spherical object made up of filamentary material with a denser concentration of filaments near the surface of the spherical object than the filament concentration spaced apart from the surface.

8 Claims, 13 Drawing Figures

SPHERICAL OBJECT USEFUL AS FILLER MATERIAL

This is a continuation-in-part application of our co-pending application Ser. No. 324,142, filed Jan. 16, 1973, now abandoned.

This invention relates to the filler material used for bedding products — e.g. quilts, pillows, etc., — wind jackets, sleeping bags, cushions, etc. and to the manufacture and end use of such material.

Down, cotton and synthetic staple fiber has been used as filler for bedding products — such as quilts, pillows and so forth — wind jackets, sleeping bags, cushions, etc.

Among these materials, down shows excellent properties in bulkiness, softness, thermal insulation, compression recovery and moisture transportation. Products such as quilts filled with down conform well to the human body on which it is used, because of the draping property of down-filled products due to the mobility of down in quilts, etc.

Down absorbs and transports water vapor, so that the excellent properties of down are retained even under damp conditions. Down is, however, susceptible to damage in insects and bacteria. On the other hand, so little down is produced in the word that its price is very high.

Cotton, compared with down, is inferior in bulkiness, softness and thermal insulation. Its compression recovery is relatively good, but not under damp conditions. Cotton is, however, used broadly for the above mentioned products, because of its low price and because of its characteristics in absorbing and transporting water vapor.

Synthetic staple fiber is made in a variety of compositions and geometrical shapes due to the wide variability in conditions for its manufacture, so that its properties, e.g. bulkiness, softness and thermal insulating property, are controlled within some range. But, staple fiber of hydrophobic material such as polypropylene has a problem as to transportation and absorption of water vapor. Its bulkiness and compression recovery are relatively good but limited because of the geometrical shape of the fibers in comparison to that of down. Compared with those filled with down, products filled with cotton or conventional synthetic staple fiber do not conform well to the human body on which it is used.

The purpose of this invention is to provide a kind of synthetic filler material having improved properties and a method for manufacturing such material. This material has especially excellent properties of bulkiness, compression recovery, softness, lightweight, drape or fitting to the wrapped body and thermal insulation as compared to down.

Another purpose of this invention is to provide a filler materials which facilitate the production of products, e.g. quilts, pillows, wind jackets, sleeping bags, etc., filled with this filler material.

This invention reltes to a synthetic filler material, the particle of which consists of round cross-section spherical objects, as described below, which objects are composed of filaments at least 0.2 meter in length running in three dimensional space, having a filament distribution that is denser in the outer portion near the surface of the object and thinner in the inner portion, the filaments being fixed on each other at their points of contact. In these spherical objects filamentary elements are prevented from intruding into or through other elements and groups thereof when the objects are compressed or stressed.

This invention also relates to the method of manufacturing the above filler material. This method comprises opening or separating the filaments (which are at least 0.2 m in length) with a gas stream, jetting the filaments into a vessel having some pores on its wall, piling the filaments in its while rotating and shearing (i.e. subjecting to a shearing it the piled filaments with eccentric gas streams, thus bending the filaments three dimensionally and compressing the filaments on the vessel walls — such as the cocoon of a silkworm. After transforming the filamentary mass into a sphere in this manner (as described in detail below) points of contact of the filaments are set and fixed.

By way of background to the present invention, the present inventors investigated the properties and the structure of down which is well known and widely used as an excellent filler material. The results of the investigation are summarized as follows:

Down has a dendroid structure in which several tens of fine branches are developed from the end of a tiny stem or root, and each branch has many tiny twigs or protrusions along both sides of it, making itself barb-like. These branches are so fine and so tender that they bend very easily. Because of these structural features of down, the feathers of down are prevented from intrusion or tangling of each element into or with other elements or groups of elements when down is compressed or stressed. Moreover, the branches are substantially bulky due to their barb-like structure. Most down feathers are smaller than 25 mm in representative diameter. All of these features of the structure of down feathers help a mass of down to flatten with gentle resistance under compressive force and to easily recover from such force; on the other hand, it allows each feather of down to migrate within their mass.

In contrast, cotton, wool and synthetic staple fiber do not have a branch or bar-like structure so that their masses are easily flattened under compressive action and do not recover as does down.

Figure 1A:
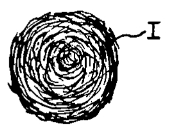
FIG. 1A is an outer view of a spherical object.
Figure 1B:
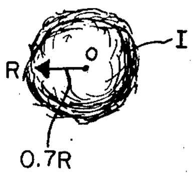
FIG. 1B is a cross-sectional view of a spherical object.

After many attempts, we reached the conclusion that the structure and shape shown in FIG. 1 provides the same characteristics and three-dimensional structure as down. Shown in FIGS. 1A — 1B are round cross-section structures, namely a filamentary spherical object, in which the filaments are arranged three-dimensionally, forming a denser outer portion near the surface of the object and a thinner inner portion, and the filaments are set or fixed at their contacting points. Because of these features of the object, the object is bulky, soft, has high compression recovery and has excellent quality as thermal insulation.

FIG. 1A is an outer view of a spherical object, and FIG. 1B is a cross-sectional view of the spherical object.

Figure 2:
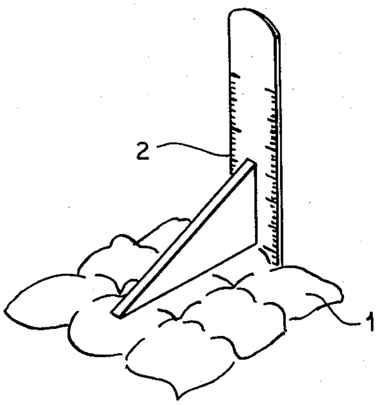
FIG. 2 illustrates a testing apparatus.

To explain the make-up of our invention in more detail, the features of our novel filler are described in comparison with conventional fillers as follows:

FIG. 2 illustrates an apparatus used in determining the bulkiness of various test samples. In FIG. 2 there is shown a quilt 1 under evaluation; a sliding scale 2 is used in measuring the thickness or height of quilt 1. This thickness or height is a measure of the bulkiness of the filler in quilt 1, and is evaluated as follows:

A sample of filler to be tested is packed into a soft cloth bag, which is 30 cm × 30 cm in dimension and is roughly stitched at 10 cm intervals parallel to the edges of the cloth, as seen in FIG. 2. At first, with 50 grams of the filler sample packed evenly into the bag, the thickness or height of the bag is measured by the sliding scale 2 described above. After that, 5.0 grams of filler sample are added to make 10.0 grams, and the height is again measured. This procedure is repeated until the filler weight is 30.0 grams.

Figure 3:
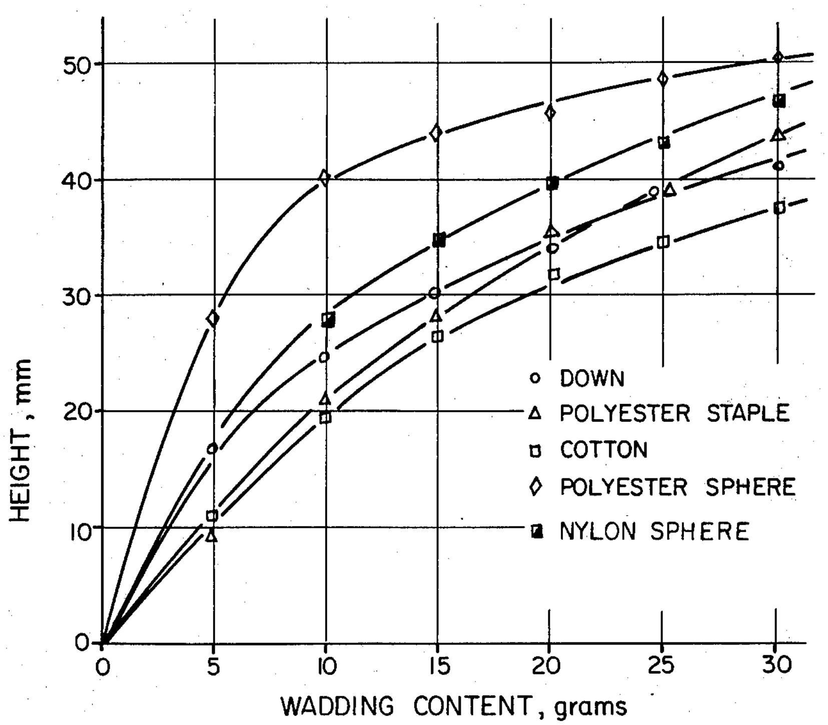
FIG. 3 is a graph of test results.

FIG. 3 illustrates graphically the results of this experiment on the bulking properties of various filler material samples. As seen in this figure, down shows high bulkiness even with a very small amount of filler and approaches rapidly its final or ultimate height. On the contrary, a sample of synthetic staple fiber, more specifically, conventional conjugated crimped polyester staple, gives a curve with a constant, rather than linear, increase of height as the amount of packed filler is increased. These curves in FIG. 3 demonstrate the superiority of down as a filler material in comparison to the other conventional filler samples, in bulking or compression behavior and softness. Filler samples of the sphere embodiments of our invention give a curve similar to that of the down.

With the empirical conditions we employed, these curves — H (height) vs. M (mass) may be formulated as an empirical equation as follows:

$$H(m) = H_\infty[1 - \exp(-Cm)],$$

where $m$ is the packed mass of sample in grams; H is the height of the packed model quilt in mm $H_\infty$ and C are both characteristic constants of the sample which are determined with the quilt cloth being fixed. A larger value of $H_\infty$ indicates a greater limiting or ultimate height of sample mass, and higher bulking power; a large value of C indicates a steep slope for the curve character of the sample and a rapid rise of the sample to its limiting height with increased filler mass. From another viewpoint, a large value of C indicates gentle resistance to a compressive force on the quilt cloth, and therefore a high value of softness.

These characteristic constants for several filler materials are tabulated in Table 1.

Table 1

| | $H_\infty$ (mm) | C ($g^{-1}$) |
|---|---|---|
| Down | 50 | 0.054 |
| Polyester S. F. | 60 | .045 |
| Cotton | 50 | .046 |
| S(1) sphere Nylon 6 | 55 | 0.051 |
| S(2) sphere PET* | 58 | .104 |

*polyethylene terephthalate

Figure 4A:
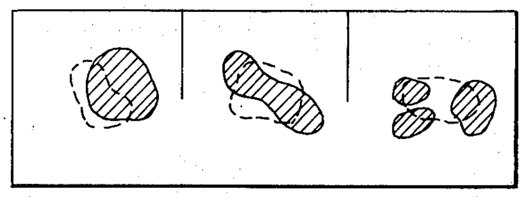
FIGS. 4A and 4B illustrate migration or mobility tests.

The fitting property or conformability of a quilt to the human body is evaluated by sensory observations, e.g., covering a hand or arm model with a test quilt and observing the hollows between the model and the quilt. In any event, to provide a quilt with well-fitting properties, it is desirable to use a filler, the elements of which are mobile in their mass, in which the filler mass is plastic as a whole. To observe this migration behavior of filler elements, a filler sample is packed into the cloth bag described above, and a small amount of colored elements of the filler is placed in the mass near the center of a square containing the mass and the colored elements are surrounded by stitch lines. The sample is then folded ten times on a line through the stitched area and the new location of the colored filler elements is then observed. After folding such a quilt test sample filled with down ten times back and forth along a line on which were located areas containing colored filler elements, as indicated by broken lines in FIG. 4A, the colored elements of down, after the folding action above, were observed to have moved to the areas indicated by solid lines in FIG. 4A, thus demonstrating the macroscopic migration or mobility of down filler elements. In contrast to down, neither conventional synthetic staple fiber nor cotton shows any migration or mobility of elements in a test of the type just described.

Thus, down gives quilts or other similar products which fit or conform well to the human body; in other words, a mass of down filler is a macroscopically soft plastic material with high bulkiness. Neither conventional synthetic fiber nor cotton shows such fitting behavior or conformability to the human body.

Figure 4B:
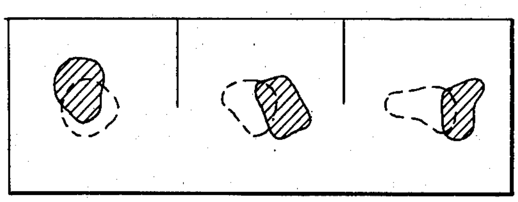

FIG. 4B shows the migration or mobility of the spherical element embodiment of this invention based on a test as described above. As seen in this figure, the spherical objects of this invention migrate like down, and these fillers also provide well-fitting properties or conformability in quilts filled therewith.

It is thought that the reasons for the similar behavior of the spherical object filler material of our invention to that of down, are:

1. Each element of the filler mass is dependent on each other element but the elements are mutually exclusive, i.e., they cannot penetrate one another.

2. The outer portion of each filler element is higher in filament density than the inner portion; this results in greater bulkiness per unit weight greater elastic range and lower or more gentle resistance to compression.

3. The spherical object elements consist of filments at least 0.2 m in length, which are easily bent. This contributes to gentle or mild resistance of the object in compression and gives the object a greater range of elasticity.

4. Because the object of each of the filler elements consists of filaments which are longer than conventional staple, the likelihood of the filament ends protruding from the surface of the object is less than in a mass of staple fibers. This makes the object softer to the touch.

As the material for the spherical filamentary objects of this invention, nylons, polyester, polyacrylics, polyvinyl alcohols, polyvinylidene chlorides, polyurethanes and polyvinyl chlorides may be used. Filaments having potential crimping properties may also be used.

The length and fineness of the filaments comprising the spherical object of the present invention and the diameter, length and bulk density of the objects are varied depending on the products which contain these objects as filler.

As to the popular quilts and/or wind jackets for which most down is used, if a filament is finer than 2 denier, the resiliency of the object becomes too low; and if a filament is heavier than 20 denier, the objects becomes too hard and too rigid. Thus the fineness of the filament preferably ranges from 2 to 20 denier.

When the diameter of the object is smaller than 5 mm, uniformity of the object shape is scarcely realized and the object and its collective mass becomes rather non-elastic; when the diameter is larger than 50 mm, the applicable uses are limited into a very narrow range. Therefore, the diameter of the filamentary object of our invention is preferably from 5 to 50 mm and most preferably between 10 and 30 mm, which is the range in size of down feathers.

The average bulk density of the spherical object of our invention is preferably in the range between 1 and 30 mg/cm$^3$, and most preferably between 1 and 20 mg/cm$^3$. Below a density of 1 mg/cm$^3$, the resistance against compression is too low, and above a density of 30 mg/cm$^3$, compression resistance is too high. Thus a product cannot be made in either case.

As to the length of the filaments comprising the spherical object of our invention, this is different in each manufacturing method as will be described later. Filaments shorter than 0.2 m do not result in a good filler with a low inner density as required in our invention. Filaments longer than 0.2 m make it easier to produce the spherical object of the desired density through adjusting the number of filaments forming the yarn that is used and the density of the filaments.

When the spherical object filler material is used for cushions, thermal insulators or furniture packing material, the diameter and density of the object may be increased.

It is desirable to decrease the density at the inner portion of the spherical object. This means that the filaments comprising spherical objects are more concentrated at the outer portion near the surface of the objects. As indicated in the round cross-sectional views of the objects in FIG. 1B, a large proportion, usually over about 80% of the total of the filaments is preferably located in a portion of the object of from 0.7 R to 1.0 R from the center of the object, where R is the radius of the object.

As the density of the outer portion of the spherical object is decreased and that of the inner portion is increased, then the elastic properties of the object becomes less desirable. Also, the spherical object may be substantially hollow.

Figure 5A:
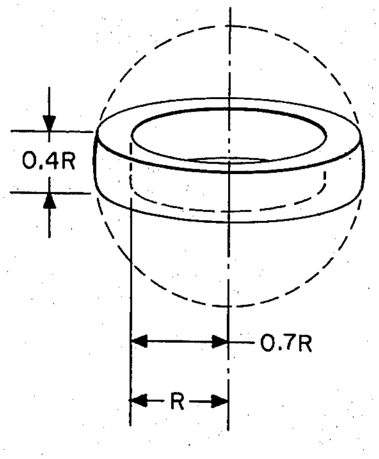
FIG. 5A illustrates a specimen of a spherical object.

The density distribution of the objects of our invention is determined as follows: FIG. 5A is a sketch of a speciment of a spherical object. From a sample as shown in FIG. 5A, a disc-like specimen is prepared by cutting a spherical object along planes parallel to the equator thereof and spaced a distance 0.2 R therefrom where R is the radius of the spherical object; a hole having a radius of 0.7 R is then bored through the center of the disc by a cutter. The hollow disc specimen thus obtained is weighed. The volume of this specimen is nearly 0.233 that of the shell volume at a distance of from 0.7 R to 1.0 R from the center of the spherical object, according to the following calculation.

$$0.4\,R \times \pi\,[R^2-(0.7\,R)^2] \,/\, (4/3)\,\pi\,[R^3-(0.7\,R)^3] = 0.233$$

More than 80% of the total filament weight is located in the spherical shell described above; if the weight of the hollow disc Mo is as follows:

$$0.8\,Mo \times 0.233 \leqq Mo \leqq \times]0.233$$

where M is the total weight of the spherical object. From the ratio Mo/M, the density distribution is determined.

The spherical object is used for quilts and/or garments, where spherical objects are subjected to the action of compression and shearing forces. Therefore it is necessary to prevent permanent deformation or disintegration of the spherical object of the filler material by setting the filaments at their contacting points so that they are fixed. This setting procedure is carried out by applying an adhesive agent at these points, or by heating the object with thermoplastic polymer at these contacting points. In the latter case, the thermoplastic polymer has a melting point at least 30° C below that of the filaments, and the amount of said thermoplastic polymer may be at least 30% by weight based on the weight of filaments constituting said object. In the latter case, staple fiber, thermoplastic powder or filaments may be used consisting of the polymer or such polymer may comprise the sheath part of conjugate sheath and core-type filaments, and such polymer may also comprise the one component of at least two components of a side-by-side filament. These thermoplastic materials, such as filaments, made up in part or entirely of polymer are blended, in a proportion of at least 30% with the higher melting point fibers to form spherical objects. The difference in thermal shrinkage (between the adhesive and non-adhesive filaments) during heat setting should be less than 15% in length.

The methods of manufacturing spherical objects for filler are described as follows:

Filaments longer than 0.2 m in length are opened or separated with a gas stream, jetted into a cylindrical vessel and piled up. After that the piled filaments are sheared and rotated by an eccentric stream of gas in the vessel. As a result, the filaments forming the pile are bent three-dimensionally and condensed on a high density layer onto the inner wall of the cylindrical vessel by a centrifugal force due to the rotation thereof and the filament pile is transformed into a spherical object, which is then set by "fixing" the filaments at their contacting points.

Figure 6A:
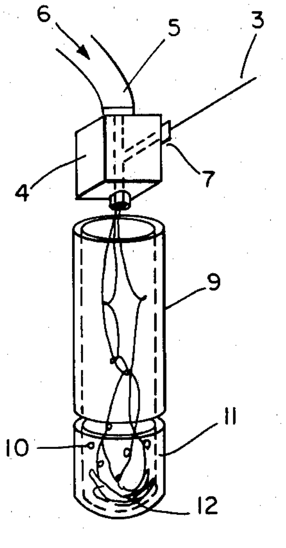
FIGS. 6A, 6B, 6C, 6D and 6E are schematic illustrations of the manufacturing method.
Figure 6B:
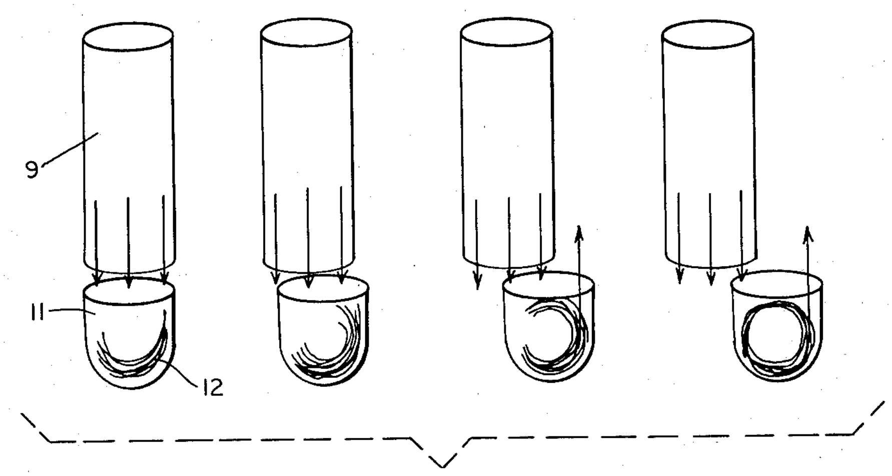

FIG. 6A is a schematic illustration of an example of the manufacturing method of this invention. In this figure, filaments 3 are supplied to a nozzle 4. Compressed air 6 is led into nozzle 4 through inlet tube 5 connected to nozzle 4. Thus, filaments 3 are sucked through inlet 7 and ejected into a connecting tube 9 along with the air 6. During this travel, filaments 3 are opened or separated in nozzle 4 under the action of the air stream. After passing into tube 9, the opened filaments are collected in a cylindrical vessel 11 which has pores 10, and the filaments are piled up therein. The piled filaments 12 in the vessel 11 are rotated and sheared by the action of an eccentric stream of air as vessel 11 is shifted to the side (as seen in FIG. 6B) and piled filaments 12 are transformed into a spherical object such as that shown in FIG. 1A. With this rotational motion, filaments are condensed into a denser outer portion due to centrifugal force. Thus the filaments are bent three-dimensionally, and transformed into a spherical object having a denser outer filament layer than its inner filament layer.

Figure 6C:
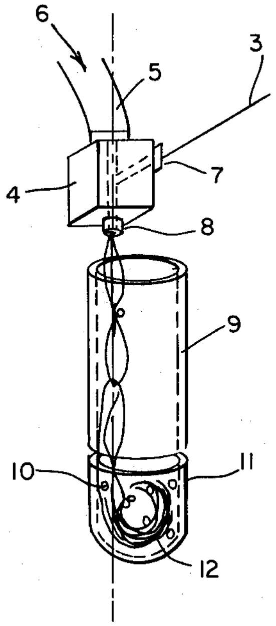

As seen in FIG. 6C, the nozzle 4 and the vessel 11 are positioned or arranged in a parallel but non-coaxial arrangement so that the piled filaments are exposed to an eccentric flow of air and then rotated and transformed into a spherical object.

Figure 6D:
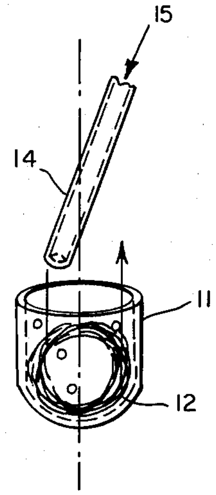

As seen in FIG. 6D, an additional eccentric flow of air 15 may be supplied from an inlet 14 to piled filaments 12 in vessel 11, rotating filaments 12 and transforming them into a spherical object.

The methods described above are satisfactorily applied separately or in combination.

To obtain filaments of definite length of more than 0.2 m, such filaments may be cut to a desired length with a conventional cutter tool or cutting device. Such filaments of definite length are then sucked into a nozzle as described above.

However, it is not usually feasible, by conventional mechanical means to lead the tip end of such cut filaments to the nozzle described above to be sucked therethrough. Therefore, a more practical method is to feed continuous filaments to nozzle 4 and to cut these filaments to the desired length as they leave the outlet of the nozzle by an intermittent cutting device.

Nozzle 14 may consist of any means or device that sucks filaments 3 and opens them with an air stream. An air texturizing nozzle is an example of such a device. Pneumatic pressure of from 1 to 5 kg/cm$^2$ has been employed in our experiments.

There is, for all practical purposes, no limit in shape or size to the connecting tube that controls the ejected air stream and the opened filaments and ensures their collecting in the cylindrical vessel as a pile.

Figure 6E:
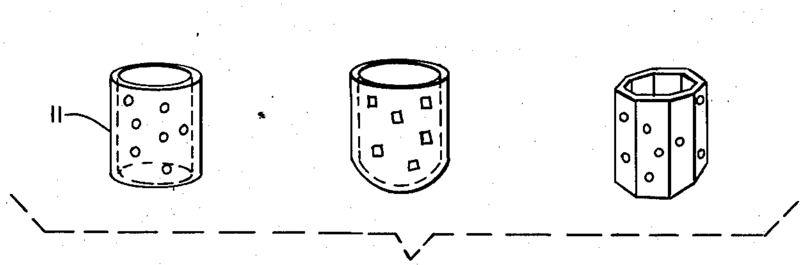

The collecting vessel must have some pores on its side wall and a smooth round shaped bottom; typical shapes for such a vessel are shown in FIG. 6E. The size of the vessel is chosen to correspond to the desired sphere size; in general, it is from 5 to 50 mm in inner diameter, and its axis is preferably somewhat longer than its diameter in order to prevent the filaments from flying out of the sphere during rotation. When the side walls of said vessel include no pores 10, the jet from nozzle 4 may produce a counterflow interfering with the desired air flow, making piling unsuccessful. For this reason, pores are needed on the side wall and the bottom of the vessel so that the filaments are smoothly piled up in the vessel while the air is smoothly flowing out through the pores.

The size of these pores is preferably from 1 to 3 mm in diameter, and the area ratio of the total area of all of the pores to that of the total wall is in the range from 5 to 50%.

Air stream 15, rotating the piled filaments 12, as shown in FIG. 6D, may be made eccentric in position by changing the position and/or the angle of the ejecting tube 14. While the pneumatic pressure used in jetting these filaments may be less than 2 kg/cm$^2$, it may also be intermittent, rather than a continuous flow, which also produces a good shaped spherical body. The period of this intermittent flow may be in the range from $5 \times 10^{-1}$ to $1 \times 10^{-2}$ sec.

The points of contact of the filaments comprising the spherical object thus obtained may be fixed in any of the following three manners.

The first such manner is a method in which an adhesive agent is sprayed onto the spherical object for fixing the contact points of the filaments which make up this object. Any conventional adhesive agent may be used. For example, silicones and/or acrylic esters are preferable because of their adhesive strength and the softness of the resulting product. These adhesives may be applied in liquid form, as an emulsion or in some other condition. The adhesive should be used in an amount of more than 10% of the filament weight in the object of the filler material in order to keep the fastness of the spherical object.

The second method is as follows: A filamentary or powdered thermo-melting component is blended into the filaments of the spherical object and the thus-blended body is heated to a temperature above that at which the blended thermo-melting component melts but below that at which the filaments comprising the spherical object melt, thus fixing the contact points of the filament comprising the spherical object by melting and re-setting the thermo-melting component. In this case, the melting point of the thermo-melting component is preferably below that of the filaments comprising the spherical object by 30° C or more. If this difference in these melting points is smaller than 30° C, the thermo-fixing or setting process might result in the thermal deterioration of the filaments comprising the spherical object.

If the filamentary thermo-melting component should contact and cohere in the thermo-fixing process, it might condense to the center of the spherical object, resulting in distortion of the spherical object. To prevent this result, it is preferable that the thermo-melting filamentary component be shorter than the peripherial length of the spherical object.

Any polymer may be employed as the thermo-melting filamentary component which melts at a temperature below that of the filament comprising the spherical object by 30° C or more and which is obtained and used either as a filament or a powder. For example, a copolyester of poly-butylene terephthalate-isophthalate and adiphate, nylon 6, nylon 12, nylon 66, nylon 610 and the copolymers of the monomeric constituents of two or more of these polymers may be used.

The thermo-melting filamentary component may be fed and mixed into the filaments used in making the spherical object, for example, from a sucking nozzle diagonally attached to a connecting tube or tapered tube or in an air stream of the filaments.

The third method involves making the spherical object from a combination of adhesive and non-adhesive filaments and treating the spherical object at a temperature above the melting point of the adhesive filament and below that of the non-adhesive filament, thus fixing the contact points of the filaments.

Adhesive filaments, useful in the process just described, maybe produced in conventional conjugate filament spinning processes.

The difference in melting points of these components (adhesive and non-adhesive filaments) is preferably greater than 30° C for easy control of the process temperature and prevention of thermal deterioration of the high melting non-adhesive component. Both components are preferably similar to each other in order to avoid the disengagement of the filaments at their contacting points. Typical combinations which may be employed are polyethylene terephthalate, poly-butylene terephthalate-isophthalate, adipate, copolymer and poly-amide, such as nylon 6, -12, -66, -610 and copolymers thereof, and poly acrylonitrile and copolymers thereof, such as methacrylate.

The ratio of adhesive filaments to the total filaments content of the spherical object should be 30% or more, preferably 50% or more.

Figure 7:
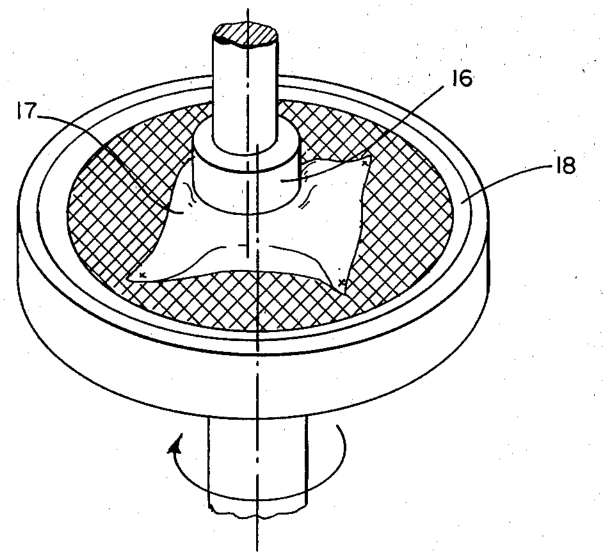
FIG. 7 illustrates testing apparatus.

The fastness of the spherical object under end-use conditions is evaluated as follows: A pre-selected mass of filler material such as the spherical object is packed in a model cloth bag of 10 cm × 10 cm in dimension, and the packed bag is mounted on the apparatus seen in FIG. 7, shearing and compression is simultaneously applied to bag 17 by the horizontal rotation of the turntable 18 attached to this apparatus. A compressive force of 500 g is applied by member 16 to bag 17. After one hour of operation, the filler material is removed from the bag to be observed.

The individual elements or objects of the filler material could not be separated due to tangling of filaments between the objects when the content of the adhesive filaments was less than 30% of the total filaments making up the spherical object, and deterioration of the filler was also observed.

When the content of the adhesive filaments was between 30 and 50% of the total filament content in the spherical object, the filler material was observed to flatten somewhat but the individual elements were still separable from each other after having conducted the compression and shearing test. The bulkiness and compression recovery of its model quilt with this filler was maintained and the softness was very much increased. Filler made of the spherical object containing more than 50% adhesive filament also maintained the original shape and the good properties of the model quilt.

Filler material made of the spherical object containing adhesive filaments cannot be thermo-set while keeping the size and shape of the spherical object constant; generally, the spherical object becomes smaller due to the contraction or shrinkage of the adhesive filaments. This is true in general because shrinkage of adhesive filaments is higher than that of non-adhesive ones. If this shrinkage difference should exceed 1%, the adhesive filament shrinks so greatly compared to the non-adhesive filament that the former is concentrated into the inner portion of the spherical object. This results in the formation of an inner portion of high filamentary density in the spherical object and distortion of the spherical object. This causes undesirable properties in products made from such material. If this shrinkage difference is less than 10%, the increase in density of the inner portion of the spherical object is so little that the desirable properties of the products made from it are not noticeably affected.

To limit the difference in shrinkage of the adhesive and non-adhesive filaments to less than 1% at the thermo-setting condition, when each filament is produced under different conditions of spinning, drawing, thermo-setting, etc., the adhesive filament is produced by adjusting the content of the low melting component.

The thermo-setting temperature of the spherical object is higher than the melting point of the low melting component and lower than that of the high melting component filament, and is preferably as low as possible.

Filler material made of the spherical object thus obtained, may be treated with lubricating agent and/or antistatic agent, to be able to slip over each other smoothly and to avoid generation of static electricity.

Fibrous or textile products in which filler material comprised of the spherical object thus obtained, was packed as filler separately or in combination have excellent properties, very similar to those of the corresponding product made with natural down. Those properties are, namely, excellent bulkiness, lightweight, gentle softness, good compression recovery and fitting property or conformality to the wrapped body.

Recommended products in which filler material comprised of the spherical object may be used as a filler are quilts, pillows, sleeping bags, (and beddings in general), wind jackets, snow wear and so forth. Moreover filler material comprised of the spherical object may be used as a filler for cushions, packagings, insulating materials, etc.

When conventional cotton or synthetic staple fiber is used for making products such as bedding, such fiber is first converted to a web through a carding process, and these webs are piled up and packed into a lining cloth. In contrast, the filler material of our invention may be randomly packed into a lining cloth without carding and piling for making products such as quilts. The potential for reducing the manufacturing cost of such products is therefore apparent.

In addition, products packed with conventional cotton or synthetic staple fiber filler do not have high compression recovery. Therefore, these products cannot be highly compressed or vacuum packaged for shipping. In storage and transportation therefore, they require a very large space. In contrast, the filler material of our invention, which has excellent compression recovery, may be shipped or stored either in a highly compressed state or vacuum packed. This means a reduction in cost for storage and transportation due to the very small space required.

Characteristics required as a filler material include bulkiness, compressibility, compression recovery, softness and touch (smoothness).

Objects having the aforementioned characteristics and which will not lose said characteristics after use for a long period of time are considered to have excellent filler characteristics.

Some important differences between a spherical object according to this invention and a cylindrical object such as disclosed in U.S. Pat. No. 2,571,334 include:

A. A spherical object exhibits the same reaction to compression from any direction. In contrast, a cylindrical object is naturally different in compression characteristic, depending upon the direction in which the compression is exerted.

This inequality in compression (directionality) of a cylindrical object, when cylindrical objects are collected as filler into a product, results in poor touch (smoothness) and the product lacks softness, giving an unequal feel. This drawback reduces the value of the filler product.

B. When compressed for a long period of time and rubbed during use, a cylindrical object tends to be flattened in one direction.

C. When many fiber ends protrude from the surfaces of a spherical object and from a cylindrical object, this results in aggravation of touch by the effect of the fiber ends and becomes a cause for pilling due to intertwinement of fiber ends as seen in fabrics (in the cases of spherical objects and cylindrical objects, intertwinement of individual spherical objects and cylindrical objects is brought about).

Especially, a cylindrical object as disclosed in U.S. Pat. No. 2,571,334 uses a staple fiber. Therefore, the chances are that the fiber ends will protrude on the entire surface and the entire aggregation becomes a "dumpling," which remarkably depreciates the characteristics of the filler product.

A spherical object of this invention uses long fibers each having a length of at least 0.2 m and the fibers coil along the circumference of the spherical object. Therefore, the fiber ends are unlikely to protrude from the surface of the spherical object.

When a cylindrical object is cut into a proper length and used, fiber ends tend to concentrate on the cut surface, aggravating the touch. At the same time, intertwinment due to the fiber ends tends to be brought about at said cut portion.

D. Recently, the produced amounts of feathers and of down have not met the demand. Therefore, many attempts have been made to mix synthetic fiber staple material with feathers or down. However, when the down and the synthetic fiber material are intertwined, they become "dumplings" and the characteristics of the filler product deteriorate.

As the outer portion of the spherical objects of this invention are so constituted as to have high density, down does not come into the spherical objects. Therefore, it is possible to uniformly mix the down with the spherical objects. And the characteristics of both the down and the spherical objects complement each other.

However, in the case of cylindrical objects whose insides are low in density or hollow, down enters into the cylindrical objects from the lower density portions on the cut surfaces of the cylindricl objects, and the down and the cylindrical objects are intertwined.

Because of this, it is not possible to combine advantageously the characteristics of both down and the cylindrical object.

EXAMPLE 1

Spherical object filler material was made in accordance with the present invention from polyethylene terephthalate filaments as follows:

| Sample No. | Denier/Filaments | | Length of Filaments |
|---|---|---|---|
| (1) | 25 | 4 | 0.4 meter |
| (2) | 75 | 12 | 1.0 meter |
| (3) | 225 | 36 | 0.15 meter |
| (4) | 375 | 60 | 1.0 meter |

These filaments were fed into a nozzle 4, actually an air texturizing nozzle, through inlet 7, as shown in FIG. 6A; the filaments were opened with an air stream of 25 kg/cm$^2$ in pressure and conducted through the connecting glass tube 9 of 150 mm in length and 10 mm in inner diameter, ejected into and piled up in the vessel 11 having 40 pores 10 each 2 mm in diameter on its wall and diameter. After that, the piled filaments were rotated by an eccentric stream of air as a result of translation of the vessel as shown in FIG. 6B. Additionally, an intermittent flow of compressed air of 0.8 kg/cm$^2$ in pressure with a period of 0.05 second was applied from a glass tube 14 3mm in inner diameter to the piled filaments as shown in FIG. 6D. Spherical objects, thus obtained, were taken out, sprayed with a silicone adhesive agent, and thermally set at 180° C for 3.0 minutes; setting involved fixation of the contact points of the filaments making up the spherical objects.

The spherical objects, thus produced, had the appearance of those illustrated in FIG. 1A and had the following properties as listed in Table 2.

Table 2

| Sample No. | Diameter of sphere | Bulk density | Weight ratio (0.7 - 1R) |
|---|---|---|---|
| (1) | 14 mm | 6.8 mg/cm$^3$ | 90% |
| (2) | 14 | 6.3 | 95 |
| (3) | 14 | 4.0 | 70 |
| (4) | 14 | 32.0 | 90 |

Packed products were made with filler material made from samples 1–4 respectively; these products had the following features, respectively:

| Sample No. | |
|---|---|
| (1): | low resistance against compression, and low compression recovery. |
| (2): | Bulkiness and mobility of element similar to down, as seen in Figures 3 and 4B. |
| (3): | High resistance against compression, course touch. |
| (4): | Low bulkiness, extremely high resistance against compression. |

Filler materials consisting of spherical objects made from Sample No. (2) were vacuum packed and stored for 22 days, then taken out and allowed to recover for 24 hours. The spherical objects recovered their original shape by 100%, while the volume recovery of cotton and polyester staple after similar processing as mentioned above is about 70% and 80% respectively.

EXAMPLE 2

Nylon 6 filaments were used to make the materials of our invention as follows:

| Sample No. | Denier | Filaments | Length of Filaments |
|---|---|---|---|
| (1) | 100 | 4 | 1 meter |
| (2) | 100 | 6 | 1 meter |
| (3) | 100 | 60 | 1 meter |

Spherical object filler material was manufactured from each of these filamentary materials under conditions as described in Example 1; however, the center of the nozzle 4 was eccentric in position to the axis of the vessel 11 as seen in FIG. 6C, so that the filaments were piled up by rotation in the vessel by the eccentric jet air stream. The vessel 11 had dimensions of 25 mm in length and 20 mm in inner diameter. The results were as follows:

| Sample No. | |
|---|---|
| (1): | No satisfactory spherical objects were produced due to the high bending moment of the filaments. |
| (2), (3): | See following table 3. |

Table 3

| Sample No. | Diameter of sphere | Bulk density | Weight ratio (0.7 - 1R) |
|---|---|---|---|
| (2) | 18 mm | 3.2 mg/cm$^3$ | 95% |
| (3) | 18 | 3.2 | 90 |

The spherical objects from samples (2) and (3) were collected and packed into a cloth lining to make a separate product with filler. The results were as follows:

| Sample No. | |
|---|---|
| (2): | As seen in Figure 3, this product showed bulkiness and mobility of elements similar to that of down. After twenty days storage under vacuum the tiller recovered its |

-continued

| Sample No. |  |
|---|---|
|  | original shape perfectly when unpacked. |
| (3): | After twenty days storage in a vacuum package, the filler recovered only 80% of its original shape, 24 hours or more after unpacking. |

EXAMPLE 3

Spherical object filler material were manufactured using nylon 6 filaments (100 Denier-6 Filaments, 0.1 meter length using a method as described in Example 2.

On the other hand, a copolyamide made of nylon 6, 12 and 6.6, melting at 140° C, was spun and drawn into multi-yarn filaments of 20 Denier and 4 filaments, which was used as a thermo-melting component. These filaments were blended into regular nylon as above described in the following manner.

| Sample No. |  |
|---|---|
| (1): | Both filaments, nylon 6 and the copolymer of low melting point were sucked into the nozzle simultaneously. |
| (2): | The copolymer nylon filaments were cut into pieces of 2 cm in length, the outlet of another suction nozzle was inserted between the nozzle 4 and connecting tube 9, and from the second outlet the cut fibers above were introduced to the apparatus to be blended with the regular nylon filaments. |

Spherical objects of these blended filaments obtained in the manner described in the previous examples, were heat treated at 160° C for 30 minutes to fix the contacting points of the filaments making up the spherical bodies. The spherical objects of Sample No. (1) were not perfect spheres but had many peaks and valleys on their surfaces, and 65% of the filaments making up each sphere were condensed in the outer portion near the surface of the body between 0.7R and 1.0R distance from the center of the sphere, where R is the radius of the sphere.

These spherical objects were collected and used as a filler. The products made of this filler showed great resistance against compression.

The spherical objects of Sample No. (2) had smooth surfaces, and 85% of the filaments making up each sphere were conducted in the outer portion near the surface of the object between 0.7R and 1.0R distance from the center of the sphere.

The products made of this filler had properties and behavior similar to that of down.

EXAMPLE 4

Several samples of spherical objects for filler material were made from combinations of the following:

A. Non-adhesive filaments made of polyethylene terephthalate having a melting point of 260° C and a filament fineness of 8 denier.

B. Adhesive filaments consisting of sheath-core type conjugate fibers. The core of thse filaments was made of polyethylene terephthalate; the sheath was made of a low melting point component which is a copolymer derived from terephthalic acid, isophthalic acid, and the glycol; 1,4 butane diol, having a melting point of 175° C; the sheath-core ratio in these filaments was 3:7 and the filament fineness was 8 denier.

These filament yarns (A and B) were spun and drawn separately, and heat set at various temperatures to control the thermal shrinkage of the filaments. The heat set temperature and shrinkage of the resulting filaments was as follows:

Table 4

| Filaments |  | Heat Set Temperature | Shrinkage at 190° C |
|---|---|---|---|
| non-adhesive (A) | (1) | 130° C | 18.0% |
|  | (2) | 160° C | 14.5% |
|  | (3) | 190° C | 9.0% |
| adhesive (B) |  | 130° C | 22.5% |

The filaments types shown in Table 4 were combined and made into various blended filament yarns each of 120 denier in fineness but all of varying proportions and shrinkage differences as listed in Table 5. These yarns were then transformed into spherical object filler material in the manner of Example 1, and thermally fixed by treatment at 190° C for 30 minutes. The material thus obtained was packed into a cloth bag making a quilt model having dimensions of 10 cm × 10 cm. The weight of material packed was 1.0 g, and this quilt model was subjected to the compression and shearing action test described above and illustrated in FIG. 7. The applied load was 500 g, and the time for test was 1 hour. The results are summarized in Table 5.

Table 5

|  | Content of B | Shrinkage Difference at 190° C (30 min.) | Observations before and after testing |
|---|---|---|---|
| I | 20% | 4.5% | After testing, the spherical objects were flattened and their filaments were tangled with each other preventing separation of the spheres. |
| II | 40% | 4.5% | After testing, the spheres were flattened a little, but spheres were separable as before testing. |
| III | 60% | 4.5% | After testing, deformation of the spheres was very little. Properties otherwise maintained as those of original. |
| IV | 60% | 8% | Before testing, little ups and downs (bumps and depressions) on the sphere surface were observed. The inner layer of filaments in the spherical objects were of low density. |
| V | 60% | 13.5% | Before testing, many and sharp ups and downs were observed on the sphere surface. Resistance against compression was high. The inner portion was not of low density. |
| VI | 80% | 4.5% | After testing, substantially no deformation was observed. Properties were maintained as those of the original. |
| VII | 100% | — | Same as VI. |

These results in Table 5 show the superiority in dimensional stability and other properties of the filler material of this invention made of blended filaments containing more than 30% adhesive filaments and with a difference in shrinkage between the adhesive and non-adhesive filaments, at the heat set conditions of less than 10%.

The following is claimed:

1. A spherical object useful as a filler material having a round cross-section having a diameter of from 5 to 50 mm, said object having a surface shell composed of a plurality of arcuately arranged synthetic organic polymeric filaments of at least 0.2 m in length and between 2 and 20 denier in fineness being concentrated near the surface of said spherical object to form an outer portion near the surface of said spherical object, and said spherical object having a less dense inner portion and an average bulk density of between 1 and 30 mg/cm³, said filaments being arranged along different arcuate paths which are angularly related to each other such that different filaments intersect with one another at different points relative to the surface of said object, said filaments being adhesively fixed to each other at the points of intersection.

2. The spherical object as recited in claim 1 wherein at least 80% of the filaments comprising said spherical objects are localized in said object in the space between 0.7 R and 1.0 R distance from the center of said round cross-section, where R is the radius of said round cross-section.

3. The spherical object as recited in claim 1 wherein said filaments are fixed at the points of intersection with each other with an adhesive agent, and the amount of said adhesive agent is more than 10% of the filament weight in the object.

4. The spherical object as recited in claim 1 wherein said filaments are adhesively fixed at the points of intersection by adhesive material consisting of thermo-melting plastic material having a melting point at least 30° C below that of said filament and the amount of said thermo-melting plastic material is more than 30% of the filament weight in the object.

5. The spherical object as recited in claim 1 wherein at least 30% of said filaments are sheath and core type or side-by-side type conjugated filaments said filaments having a relatively low melting component said sheath component being a thermoplastic sheath and said side-by-side filament having at least one relatively low-melting component having a melting point which is at least 30° C below that of other filaments present which are not low melting, and wherein all said filaments are fixed to one another at contact points by heat setting said low melting component.

6. The spherical object as recited in claim 5 wherein said filaments are fixed by heat setting low melting point thermoplastic conjugated filaments, wherein the difference in degree of shrinkage of said low melting point thermoplastic conjugated filaments and said other filaments present is less than 10%.

7. A quilting or cushioning article composed of a multiplicity of spherical objects as recited in claim 1, filled in said article.

8. A spherical object having a substantially circular cross-section having a diameter of from 5 to 50 mm, said object having an average bulk density between 1 and 30 mg/cm³ and comprising a surface shell composed of a plurality of arcuately arranged filaments of polymeric material selected from the group consisting of nylons, polyesters, polyacrylics, polyvinyl alcohols, polyvinylidene chlorides, polyurethanes and polyvinyl chlorides of at least 0.2 m in length and between 2 and 20 denier in fineness, the arcs of said filaments lying substantially upon the plane of said cross-section and having curvatures substantially the same as said circle, said filaments being arranged along different arcuate paths and angularly to each other such that different filaments intersect with one another at different points along the surface of said objects, and an adhesive adjacent the surface of said object and contacting said filaments and binding them together.

* * * * *